US012695314B2

(12) United States Patent
Nagaoka

(10) Patent No.: US 12,695,314 B2
(45) Date of Patent: Jul. 28, 2026

(54) CHARGING CONTROL APPARATUS FOR PERFORMING AUTHENTICATION WITH EXTERNAL CHARGING EQUIPMENT FOR CHARGING VEHICLE ON WHICH BATTERY IS MOUNTED

(71) Applicant: DENSO TEN Limited, Kobe (JP)

(72) Inventor: Yoshinori Nagaoka, Kobe (JP)

(73) Assignee: DENSO TEN Limited, Kobe (JP)

( * ) Notice: Subject to any disclaimer, the term of this patent is extended or adjusted under 35 U.S.C. 154(b) by 733 days.

(21) Appl. No.: 18/176,049

(22) Filed: Feb. 28, 2023

(65) Prior Publication Data

US 2023/0402854 A1 Dec. 14, 2023

(30) Foreign Application Priority Data

Jun. 9, 2022 (JP) ................................. 2022-093493

(51) Int. Cl.
| | |
|---|---|
| *H02J 7/00* | (2026.01) |
| *B60L 53/65* | (2019.01) |
| *B60L 53/66* | (2019.01) |
| *H02J 7/47* | (2026.01) |
| *H04L 9/40* | (2022.01) |

(52) U.S. Cl.
CPC ............... *H02J 7/47* (2026.01); *B60L 53/65* (2019.02); *B60L 53/66* (2019.02); *H04L 63/0823* (2013.01)

(58) Field of Classification Search
CPC .................................................... H02J 7/00045
USPC .......................................................... 320/109
See application file for complete search history.

(56) References Cited

U.S. PATENT DOCUMENTS

| | | | | |
|---|---|---|---|---|
| 2020/0130535 A1* | 4/2020 | Robert | .............. | H02J 7/007194 |
| 2020/0282859 A1* | 9/2020 | Shin | ......................... | B60L 53/66 |
| 2021/0336459 A1* | 10/2021 | Inai | ....................... | H01M 10/44 |
| 2022/0158851 A1* | 5/2022 | Shin | ....................... | G06Q 50/40 |

FOREIGN PATENT DOCUMENTS

| | | | | |
|---|---|---|---|---|
| EP | 4011684 A2 * | 6/2022 | ............... | H04L 9/50 |
| JP | 2016-131432 A | 7/2016 | | |

* cited by examiner

*Primary Examiner* — Yalkew Fantu
(74) *Attorney, Agent, or Firm* — Oliff PLC

(57) ABSTRACT

A hardware processor is configured to (i) perform a first authentication procedure with an external charging equipment that charges a battery, the external charging equipment being external of the apparatus on which the battery is mounted, and (ii) when an abnormality is detected in the first authentication procedure, perform the first authentication procedure or a second authentication procedure in place of the first authentication procedure depending on a type of the abnormality.

14 Claims, 7 Drawing Sheets

CHARGING CONTROL APPARATUS FOR PERFORMING AUTHENTICATION WITH EXTERNAL CHARGING EQUIPMENT FOR CHARGING VEHICLE ON WHICH BATTERY IS MOUNTED

BACKGROUND OF THE INVENTION

Field of the Invention

The invention relates to a charging control apparatus and a charging control method.

Description of the Background Art

A battery electric vehicle (BEV), a plug-in hybrid vehicle (PHV), and the like, have been known as a vehicle (hereinafter, referred to as an electric vehicle) whose battery for travelling is charged by being connected to an external power source. Furthermore, for a billing method of charging the battery for travelling, an external identification means (EIM) and a plug and charge (PnC) that is specified in ISO15118-2 are mainly proposed.

In the external identification means, a user of the vehicle makes a payment in a charger installation place or with the charger itself using cash, electronic money, prepaid cards, credit cards, etc. On the other hand, in the PnC, when a plug of the charger installed in a charging stand is connected to the vehicle, billing and charging become possible.

However, in an early stage after starting a billing and charging service by the PnC, various events may be caused by defects, such as an authentication method compatibility, a validity of authentication information, a validity of a contract, and the like, between an apparatus on which a battery is mounted, such as an electric vehicle, and charging equipment.

SUMMARY OF THE INVENTION

According to one aspect of the invention, a charging control apparatus that is installed in an apparatus on which a battery is mounted includes a hardware processor. The hardware processor is configured to (i) perform a first authentication procedure with an external charging equipment that charges the battery, the external charging equipment being external of the apparatus on which the battery is mounted, and (ii) when an abnormality is detected in the first authentication procedure, perform the first authentication procedure or a second authentication procedure in place of the first authentication procedure depending on a type of the abnormality.

Another aspect of the invention is to provide a charging control apparatus capable of suppressing inconvenience as much as possible between an apparatus that receives charging and an external charging equipment in an authentication for charging the apparatus on which a battery is mounted.

These and other objects, features, aspects and advantages of the invention will become more apparent from the following detailed description of the invention when taken in conjunction with the accompanying drawings.

DESCRIPTION OF THE EMBODIMENTS

A charging system and a charging control method according to an embodiment will be described below with reference to the accompanying drawings.

(Configuration)

Figure 1:
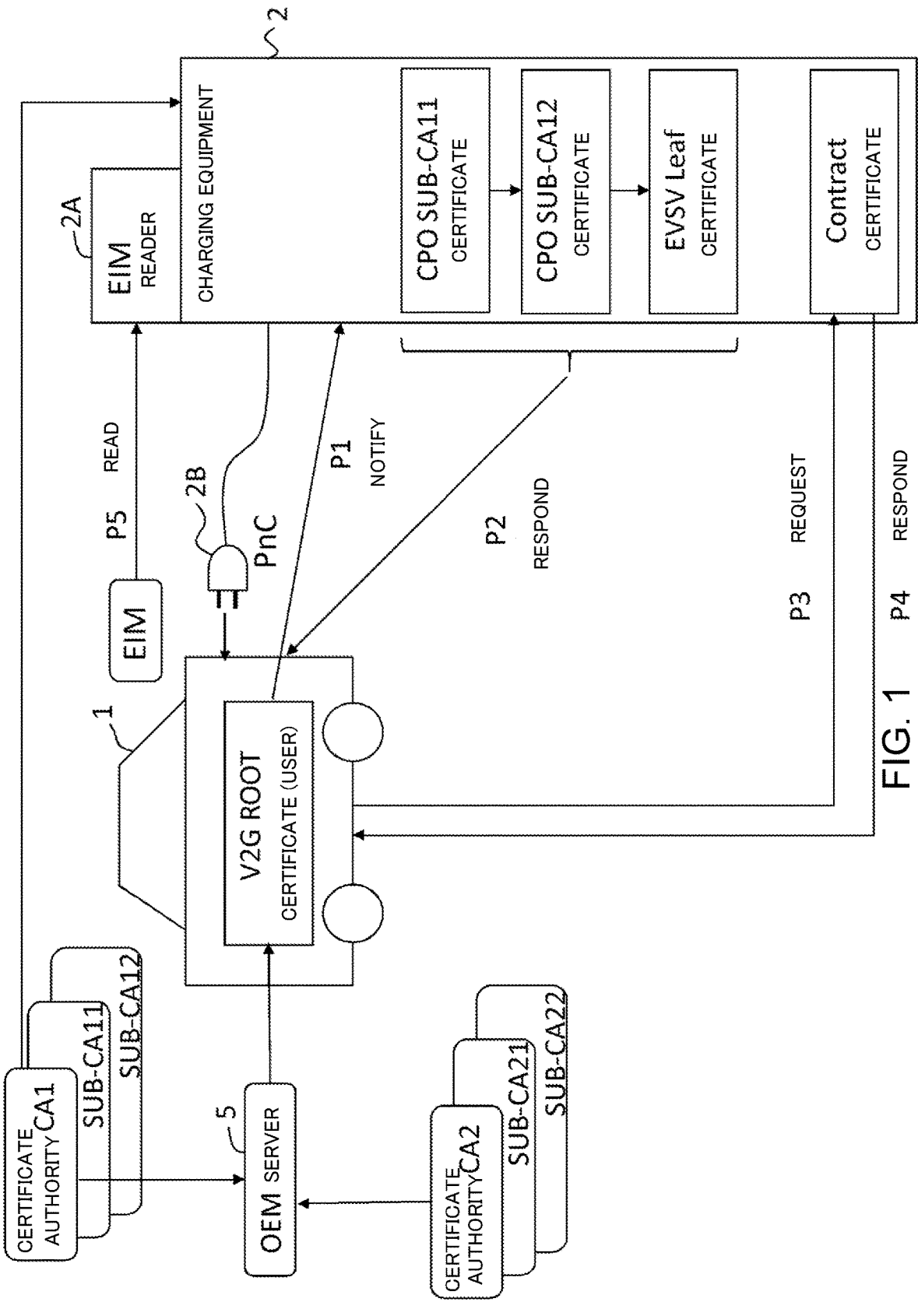
FIG. 1 illustrates a configuration of a charging system according to an embodiment.

FIG. 1 illustrates a configuration of the charging system according to the embodiment. The charging system has an electric vehicle 1 and charging equipment (Electric Vehicle Supply Equipment, EVSV) 2 that supplies electric power to a battery (also referred to as a "secondary battery" or a "storage battery") of the electric vehicle 1. FIG. 1 also illustrates certificate authorities CA1, CA2 and intermediate certificate authorities (SUB-CA11, SUB-CA12, SUB-CA21 and SUB-CA22), and an original equipment manufacturer (OEM) server 5. The certificate authorities CA1, CA2 issue certificates, such as a vehicle to grid (V2G ROOT) certificate. The OEM server 5 allows a manufacturer or distributer of the electric vehicle 1 to provide the certificate to the electric vehicle 1.

For a precondition of a process by the charging system, when the electric vehicle 1 is shipped from the manufacturer or the distributer, the V2G ROOT certificate issued by at least one certificate authority CA1 is stored in a memory (e.g., an external memory 13 of FIG. 3) of the electric vehicle 1. By accessing the OEM server 5, the electric vehicle 1 can update the V2G ROOT certificate. By accessing the OEM server 5, the electric vehicle 1 can acquire the V2G ROOT certificate issued by the certificate authority CA2 other than the certificate authority CA1. The number of the certificate authorities is not limited to two.

On the other hand, the V2G ROOT certificate issued by at least one certificate authority CA1 and a certificate chain associated with this V2G ROOT certificate are stored in the charging equipment 2. The certificate chain, for example, includes a Charge Point Operator SUB-Certificate Authority 11 (CPO SUB-CA11) certificate, a CPO SUB-CA12 certificate, an EVSV Leaf certificate, and the like.

For a first authentication procedure, in a procedure called a PnC, when a plug 2B of the charging equipment 2 is inserted into a connector (referred to as a "power receiver") of the electric vehicle 1, an authentication is carried out between the charging equipment 2 and the electric vehicle 1. After the authentication, charging of the electric vehicle 1 is performed and billing for charging is made. For the PnC, each of the electric vehicle 1 and the charging equipment 2 stores the V2G ROOT certificate in the memory. The charging equipment 2 may refer to the V2G ROOT certificate stored on a computer accessible from the charging equipment 2. The PnC can be also referred to as a first billing method.

In the PnC, after the charging equipment 2 and the electric vehicle 1 are connected through the plug 2B, the V2G ROOT certificate of a user is notified to the charging equipment 2 (an arrow P1). The V2G ROOT certificate of the user is certified by the V2G ROOT certificate of a business operator stored in the charging equipment 2. When this authentication has completed, a certificate chain of the business operator having a hierarchical configuration associated with the V2G ROOT certificate is responded to the electric vehicle 1 (an arrow P2). Communication procedures indicated by the arrow P1 and the arrow P2 are referred to as a Transport Layer Security (TLS) handshake. The V2G ROOT certificate is referred to as a first certificate for ensuring security of the communication between the electric vehicle 1 and the charging equipment 2.

The certificate chain corresponds to a hierarchy of the certificate authorities. As illustrated in FIG. 1, the certificate authorities CAL CA2, and the like, have the intermediate certificate authorities (SUB-CA11, SUB-CA12, SUB-CA21, SUB-CA22, etc.) as lower certificate authorities. The highest certificate authorities CA1 and CA2 are referred to as ROOT certificate authorities and issue the V2G ROOT certificate. Certificate authority certificates (the CPO SUB-CA11 certificate, etc.) of the lower intermediate certificate authorities are signed by the higher certificate authorities. In the certificate chain shown in an example of FIG. 1, the CPO SUB-CA11 certificate, the CPO SUB-CA12 certificate, the EVSV Leaf certificate are exemplified. In the example of FIG. 1, the certificate chain includes at least one of the CPO SUB-CA 11 certificate, and the like, and the EVSV Leaf certificate.

By sequentially authenticating the certificate chain based on the V2G ROOT certificate of the user from a higher hierarchy to a lower hierarchy, the electric vehicle 1 can eventually authenticate the EVSV Leaf certificate. When an authentication of the EVSV Leaf certificate is successful, the electric vehicle 1 acquires a secret key used for communication with the charging equipment 2, and the communication using the secret key is carried out hereafter. As a result, the TLS handshake is completed.

After completion of the TLS handshake, a V2G communication using the secret key is carried out. In the V2G communication, a request (P3) from the electric vehicle 1 and a response (P4) from the charging equipment 2 are mutually sent and charging and billing are performed. In this V2G communication, in addition to charging, for example, a Contract certificate that defines details of billing is responded from the charging equipment 2 to the electric vehicle 1.

The Contract certificate is referred to as a second certificate for the electric vehicle 1 being charged from the charging equipment 2.

In charging of the electric vehicle, in addition to the communication by the PnC described above, an external identification means (EIM) is used for a second authentication procedure. The external identification means is a process of transmitting and receiving billing information, for example, using a credit card, a QR cord (registered trademark), RFID, or the like. The external identification means (EIM) can be also referred to as a second billing method.

Figure 2:
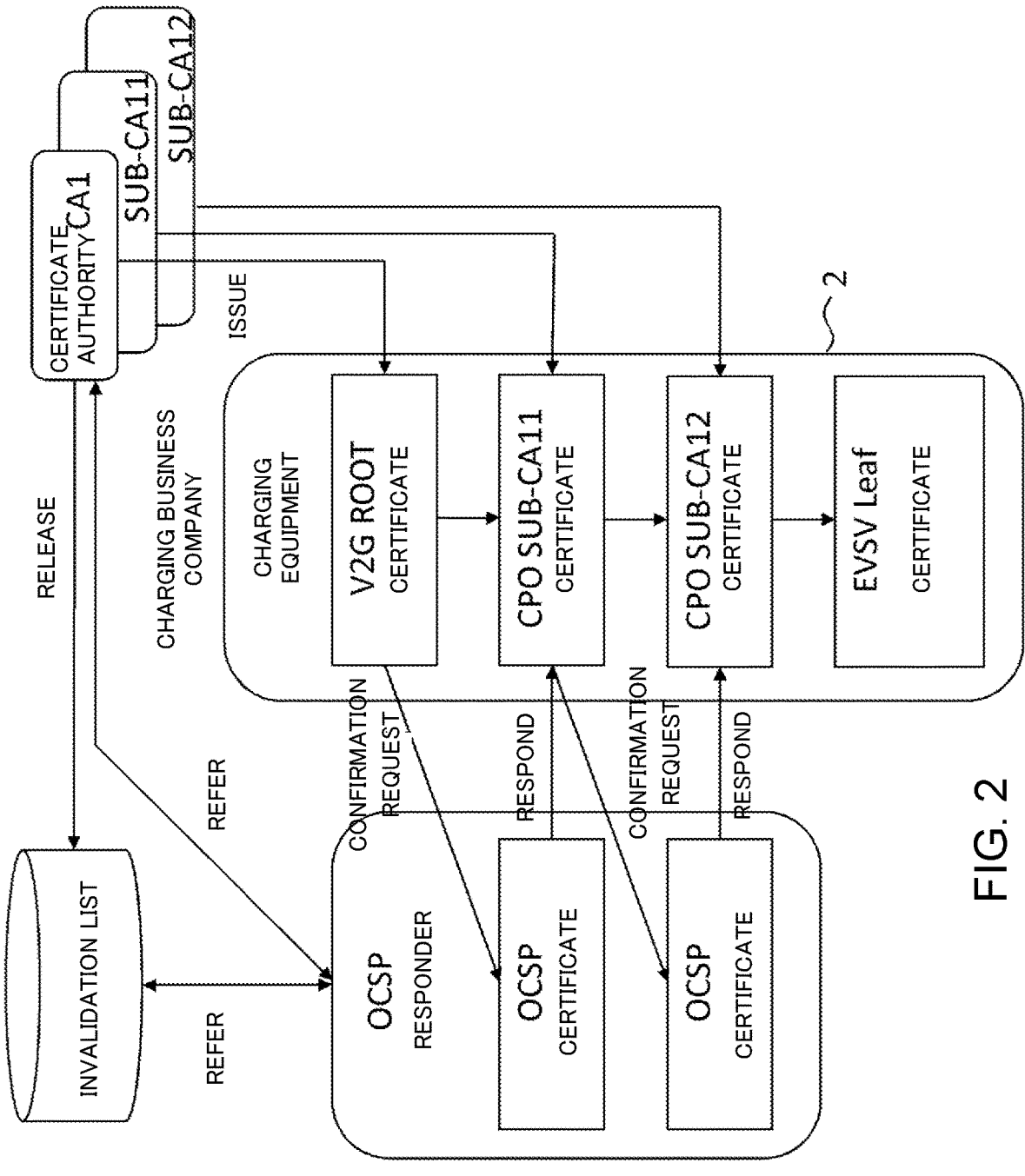
FIG. 2 illustrates a relationship between a certificate chain and a certificate authority.

FIG. 2 illustrates a relationship between the certificate chain and the certificate authority (CA1). FIG. 2 also illustrates an online certificate status protocol (OCSP) responder as a computer of an organization that makes a response on a validity of SUBCA11 and SUB-CA12 as the lower certificate authorities, and a validity of certificates.

In this embodiment, the charging equipment 2 is provided by a charging business company. The charging business company is the business operator that performs a charging service to the electric vehicle 1. However, while the charging business company is an electric power company that provides electric power, the charging equipment 2 may be provided by other business operators other than the electric power company. Here, other business operators, for example, receive a supply of electric power from the business operator that provides electric power and operate the charging equipment 2.

The charging equipment 2 is provided with the certificate chain from the certificate authority CA1 and the intermediate certificate authorities (SUB-CA11, SUB-CA12, etc.). The number of the immediate certificate authorities is not limited to two. The certificate chain includes the V2G ROOT certificate, the CPO SUB-CA11 certificate, the CPO SUB-CA12 certificate, the EVSV Leaf certificate, and the like. The certificate chain may be stored in the memory that is built in the charging equipment 2. The certificate chain may be stored in a computer to which the charging equipment 2 is connected. The computer in which the certificate chain is stored may be arranged in a site in which the charging equipment 2 is installed, for example, a site called a charging stand or a charging station. The computer in which the certificate chain is stored may be stored in a management computer, etc., of the business operator that is connected to the site in which the charging equipment 2 is installed by a network. Working with such a computer or a management computer, in the V2G communication with the electric vehicle 1, the charging equipment 2 may perform charging and billing to the electric vehicle 1 using the certificate chain. The electric vehicle 1 illustrated in FIG. 1 accesses the charging equipment 2 of the business operator having such a certificate chain and is charged by the PnC.

The certificates issued by the certificate authority CA1 and the intermediate certificate authorities (SUB-CA11, SUB-CA12, etc.) may be invalidated due to various circumstances. For example, when the certificates may be illegally used, one of the certificate authority CA1 and the intermediate certificate authorities (SUB-CA11, SUB-CA12, etc.) invalidates one of the issued certificates so that a validity of the entire certificate chain is eliminated. Such invalidated certificates are released as an invalidation list on the public network, for example, on the Internet.

The OCSP responder is a business operator that confirms the validity of the certificate chain or a computer of the business operator. For example, the OCSP responder confirms the validity of the certificates in response to a confirmation request from the computer of the business operator having the certificate chain, and returns a response to the computer of the business operator. Hereinafter the computer of the business operator is also merely referred to as a business operator. The OCSP responder accesses the invalidation list on the public network, or accesses database, etc. of the certificate authority and the intermediate certificate authorities (SUB-CA11, SUB-CA12, etc.) and conforms the validity of the certificates.

Therefore, when it is determined that a confirmation of the certificate chain is necessary, or regularly, the charging business company and the business operator that operates the charging equipment make a confirmation request of each certificate to the OCSP responder, and receives a response of a confirmation result. By such a procedure, the charging business company and the business operator that operates the charging equipment recognize and understand the validity of the certificate chain.

Figure 3:
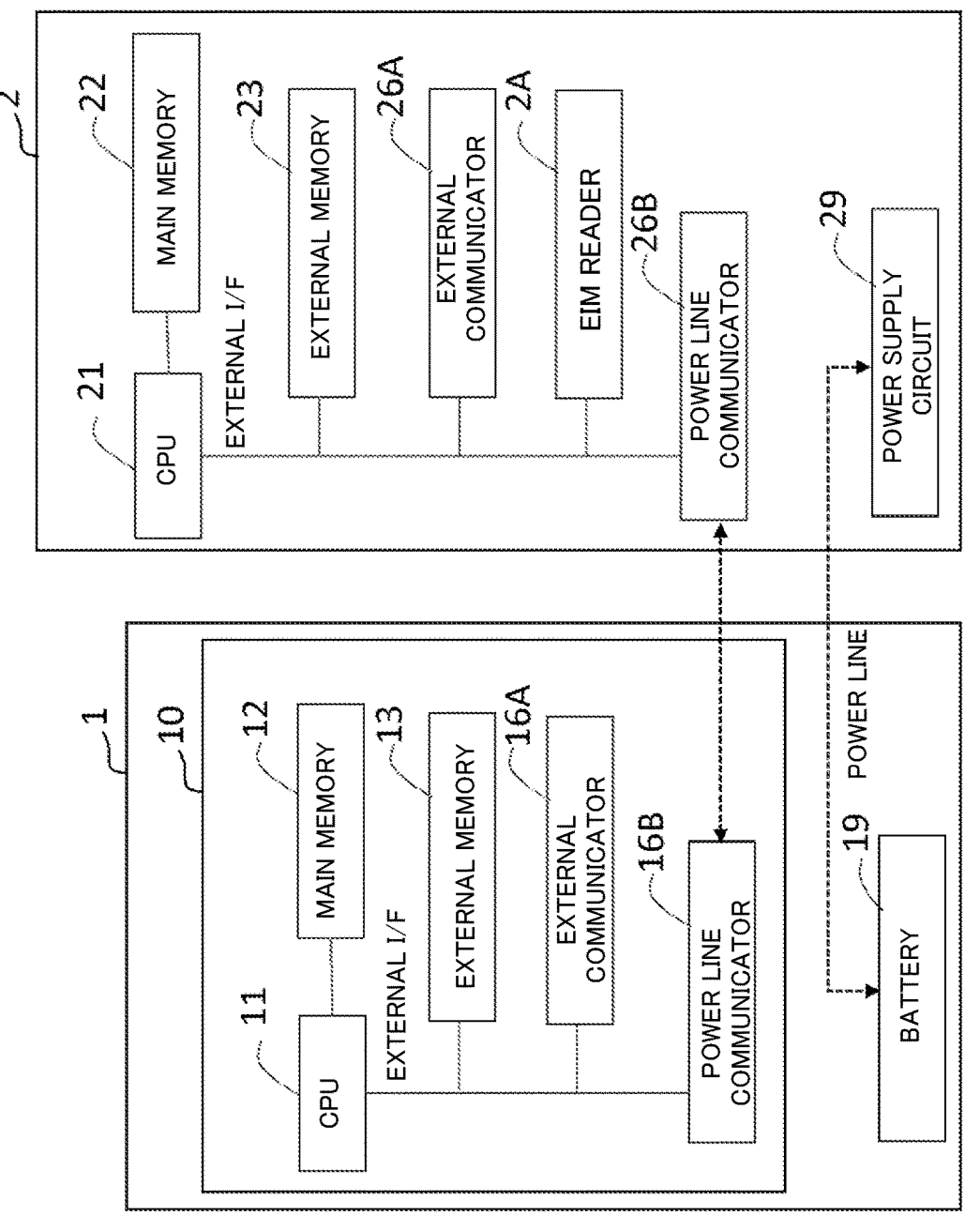
FIG. 3 illustrates a configuration of hardware of a charging system.

FIG. 3 illustrates a configuration of hardware of the charging system. As described above, the charging system of the invention is exemplified by the electric vehicle 1 and the charging equipment 2 that charges a battery 19 that is mounted on the electric vehicle 1. The electric vehicle 1 has a charging control apparatus 10 and the battery 19 to be controlled by the charging control apparatus 10.

The charging control apparatus 10 has a CPU 11, a main memory 12, and external equipment to be connected to an external interface (I/F) and executes information processing by a computer program. The external memory 13 and an external communicator 16A are exemplified as the external equipment. Furthermore, a power line communicator 16B is exemplified as the external equipment. The CPU 11 together with the main memory 12 can be referred to as a controller. When the charging control apparatus 10 is mounted on the vehicle, such as the electric vehicle 1, the controller is also referred to as an electronic control unit (ECU).

The CPU 11 executes a computer program developed to an executable state in the main memory 12 and provides functions of the charging control apparatus 10. The main memory 12 is merely referred to as a memory and stores a computer program executed by the CPU 11 and data processed by the CPU 11. The CPU 11 is also referred to as a processor.

Examples of the main memory 12 include a dynamic random access memory (DRAM), a static random access memory (SRAM), a read only memory (ROM), and the like. Furthermore, the external memory 13 is used as a memory area that supports the main memory 12 and stores a computer program executed by the CPU 11 and data processed by the CPU 11. The external memory 13 is a hard disk drive, a solid state drive (SSD), or the like.

The external communicator 16A transmits/receives data to/from other devices on the public network. For example, the CPU 11 communicates with the computer of the business operator on the public network through the external communicator 16A. The external communicator 16A may be a communication device that accesses a wireless local area network (LAN).

The power line communicator 16B transmits/receives the signal to/from a power line communicator 26B. That is, the power line communicator 16B performs power line communications (PLC) with the charging equipment 2. The power line communicator 16B may have inside a CPU, a memory, an input/output interface, a communication interface, and the like. In this embodiment, the charging control apparatus 10 communicates with the charging equipment 2 using the external communicator 16A or the power line communicator 16B and makes a charging request and performs a billing process.

The charging control apparatus 10 may further have a display and an operation portion. The display is, for example, a liquid crystal display, an electroluminescence panel, or the like. The operation portion is, for example, a key board, a pointing device, or the like.

A configuration of the charging equipment 2 is similar to that of the charging control apparatus 10 of the electric vehicle 1. The charging equipment 2 has a CPU 21, a main memory 22, and external equipment to be connected to an external interface (I/F) and executes information processing by a computer program. An external memory 23, an external communicator 26A, and an EIM reader 2A are exemplified as the external equipment. Furthermore, a power line communicator 26B is exemplified as the external equipment. Since the configuration of the charging equipment 2 other than the HIM reader 2A is similar to that of the charging control apparatus 10, a description thereof is omitted.

The EIM reader 2A is a card reader that reads information from an IC card, such as a credit card, in a contact or non-contact method, an image read device that reads a QR code (registered mark), a RFID reader, or the like.

When a plug of a power supply circuit 29 is connected to a power circuit that charges the battery 19, the charging control apparatus 10 of the electric vehicle 1 and the charging equipment 2 are mutually communicated, for example, by the power line communicators 16B, 26B and perform a TLS authentication and the V2G communication. The charging control apparatus 10 of the electric vehicle 1 and the charging equipment 2 are mutually authenticated by the TLS authentication and the V2G communication and perform the billing process for charging. However, when the plug of the power supply circuit 29 is connected to the power circuit that charges the battery 19, the charging control apparatus 10 of the electric vehicle 1 and the charging equipment 2 may be communicated via the external communicators 16A, 26A.

(Processing Procedure)

Figure 4:
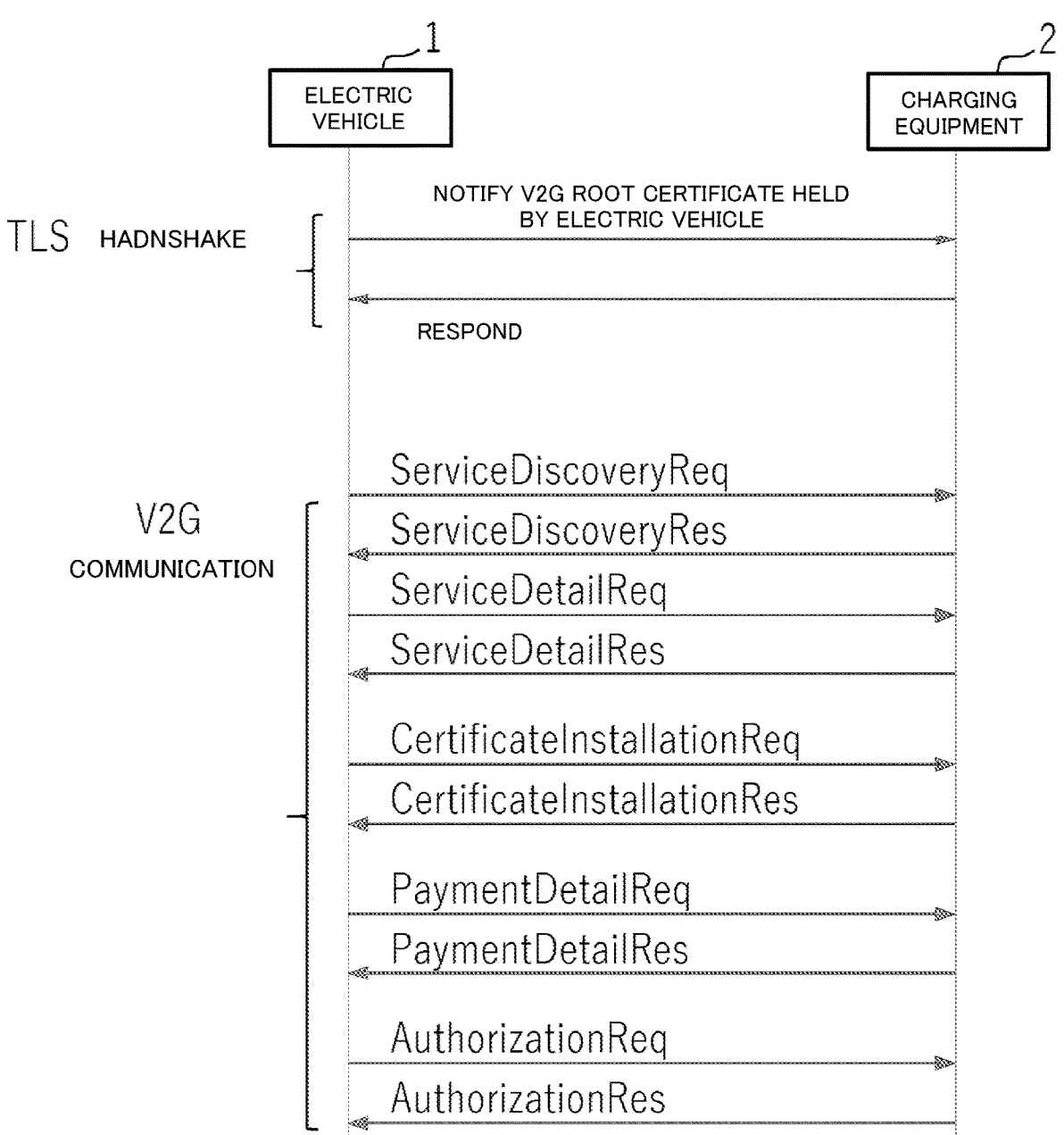
FIG. 4 is a sequence diagram illustrating a procedure up to a billing process by a PnC between a charging control apparatus of an electric vehicle and charging equipment.

FIG. 4 is a sequence diagram illustrating a procedure up to the billing process by the PnC between the charging control apparatus 10 of the electric vehicle 1 and the charging equipment 2. The procedure of FIG. 4 is started when the plug 2B of the charging equipment 2 is connected to the power receiver of the electric vehicle 1. This procedure includes the TLS handshake and the V2G communication after the TLS handshake.

In the TLS handshake, the electric vehicle 1 notifies the charging equipment 2 of the V2G ROOT certificate stored by the electric vehicle 1. On the other hand, the charging equipment 2 returns a response to a message including the V2G ROOT certificate received from the electric vehicle 1. In the TLS handshake, the electric vehicle 1 and the charging equipment 2 eventually share the secret key each other by the request from the electric vehicle 1 to the charging equipment 2 and the response from the charging equipment 2 to the electric vehicle 1. Using the secret key, the following V2G communication is performed.

Here, problems that may be caused in the PnC are exemplified. In the TLS handshake and the V2G communication after the TLS handshake, communication session for charging is expected to stop. First, problems that may be caused in the TLS handshake are exemplified.

(1) The charging equipment 2 cannot detect the V2G ROOT certificate that is the same as the V2G ROOT certificate notified from the electric vehicle 1. As a result, the communication session is expected to stop. This is a case in which the certificate authority that has issued the V2G ROOT certificate stored by the electric vehicle 1 is different from the certificate authority that has issued the V2G ROOT certificate stored by the charging equipment 2 or the computer of the business operator to which the charging equipment 2 can refer. There is a plurality of certificate authorities that issues the V2G ROOT certificate. Thus, the charging equipment 2 or the computer of the business operator to which the charging equipment 2 can refer do not always receive an issuance of the V2G ROOT certificate from the certificate authority that is the same as the certificate authority that has issued the V2G ROOT certificate stored by the electric vehicle 1. In such a case, the charging equipment 2 cannot continue the TLS handshake and the communication session stops. Also, when an expiration date of the V2G ROOT certificate notified from the electric vehicle 1 is expired, the charging equipment 2 cannot continue the TLS handshake and the communication session stops.

(2) When the charging equipment 2 cannot detect the V2G ROOT certificate that is the same as the V2G ROOT certificate notified from the electric vehicle 1, the following things are further expected. That is, in such a case, the charging equipment 2 is expected to transmit the certificate chain associated with the V2G ROOT certificate that is different from the V2G ROOT certificate notified from the electric vehicle 1 to the electric vehicle 1. In this case, the electric vehicle 1 detects an abnormality of the certificate chain transmitted from the charging equipment 2 and the communication session stops.

(3) A case in which the charging equipment 2 cannot obtain an OCSP response in an off-line state and an expiration date or validity of the certificate chain cannot be verified is assumed. The charging equipment 2, for example, regularly requests the OCSP responder to verify the expiration date or validity of the certificate chain. For example, no expiration date may be verified for any of the certificates of the certificate chain associated with the V2G ROOT certificate notified from the electric vehicle 1. At this time, when it is in an off-line state in which the communication is not established with the OC SP responder, the charging equipment 2 or the computer of the business operator to be connected to the charging equipment 2 cannot obtain the OCSP response indicating that the certificate chain is not invalidated. In such a case, the charging equipment 2 cannot continue the TLS handshake and the communication session stops.

Next, problems that may be caused in the V2G communication are exemplified. These are the problems in the process after the security of the communication between the charging control apparatus 10 and the charging equipment 2 has been ensured by the V2G ROOT certificate as the first certificate and the certificate chain associated therewith. The V2G ROOT certificate may be referred to as one example of the certificates for ensuring the security of the communication between the charging control apparatus 10 and the charging equipment 2.

(4) In the V2G communication, when the Contract certificate is not provided to the electric vehicle 1, the communication session is expected to stop. In the V2G communication, charging control and billing process are performed by exchanging messages shown in FIG. 4. For example, the electric vehicle 1 transmits a SeviceDiscoveryReq to the charging equipment 2 and the charging equipment 2 returns a list of services that can be provided to the electric vehicle 1 by a ServiceDiscoveryRes. Furthermore, the electric vehicle 1 transmits a ServiceDetailReq to the charging equipment 2 and the charging equipment 2 notifies the electric vehicle 1 of details of the services by a ServiceDetailRes.

The electric vehicle 1 requests the charging equipment 2 to issue a certificate of a currently valid contract (Contract certificate) by a CertificateInstallationReq. In reply to this, the charging equipment 2 returns the Contract certificate to the electric vehicle 1 by a CertificateInstallationRes. The Contract certificate is a certificate that indicates the details of the contract between the business operator (referred to as a mobility service provider) that supplies electric power and a user of the electric vehicle 1. The electric vehicle 1 requests the charging equipment 2 to show the billing method by a PaymentDetailReq, for example, by specifying the Contract certificate. In reply to this request, the charging equipment 2 responds to the electric vehicle 1 by a PaymentDetailRes.

The electric vehicle 1 can also request in advance a computer of the manufacturer or distributer of the electric vehicle 1, or the mobility service provider that supplies electric power to issue the Contract certificate. However, an example of FIG. 4 illustrates the procedure of requesting an issuance of the Contract certificate from the charging equipment 2 when the electric vehicle 1 is charged. In this case, the electric vehicle 1 provides a certificate (OEM provisioning certificate) issued by the manufacturer or distributer of the electric vehicle 1 to the charging equipment 2. When the charging equipment 2 has a valid Contract certificate associated with the OEM provisioning certificate notified from the electric vehicle 1, the charging equipment 2 can provide the Contract certificate to the electric vehicle 1.

However, a case in which the charging equipment 2 or the computer of the business operator to which the charging equipment 2 can refer does not hold the valid Contract certificate associated with the OEM provisioning certificate, the V2G communication session stops. Not holding the valid Contract certificate means, for example, that the expiration date of the Contract certificate has arrived, an electronic signature on the OEM provisioning certificate is invalid, an electronic signature on the Contract certificate is invalid, and the like. In such cases, since the charging equipment 2 cannot provide the Contract certificate to the electric vehicle 1, the communication session stops. Since an AuthorizationRes and an AuthorizationReq illustrated in FIG. 4 are defined in an ISO-15118, a description thereof is omitted.

Figure 5:
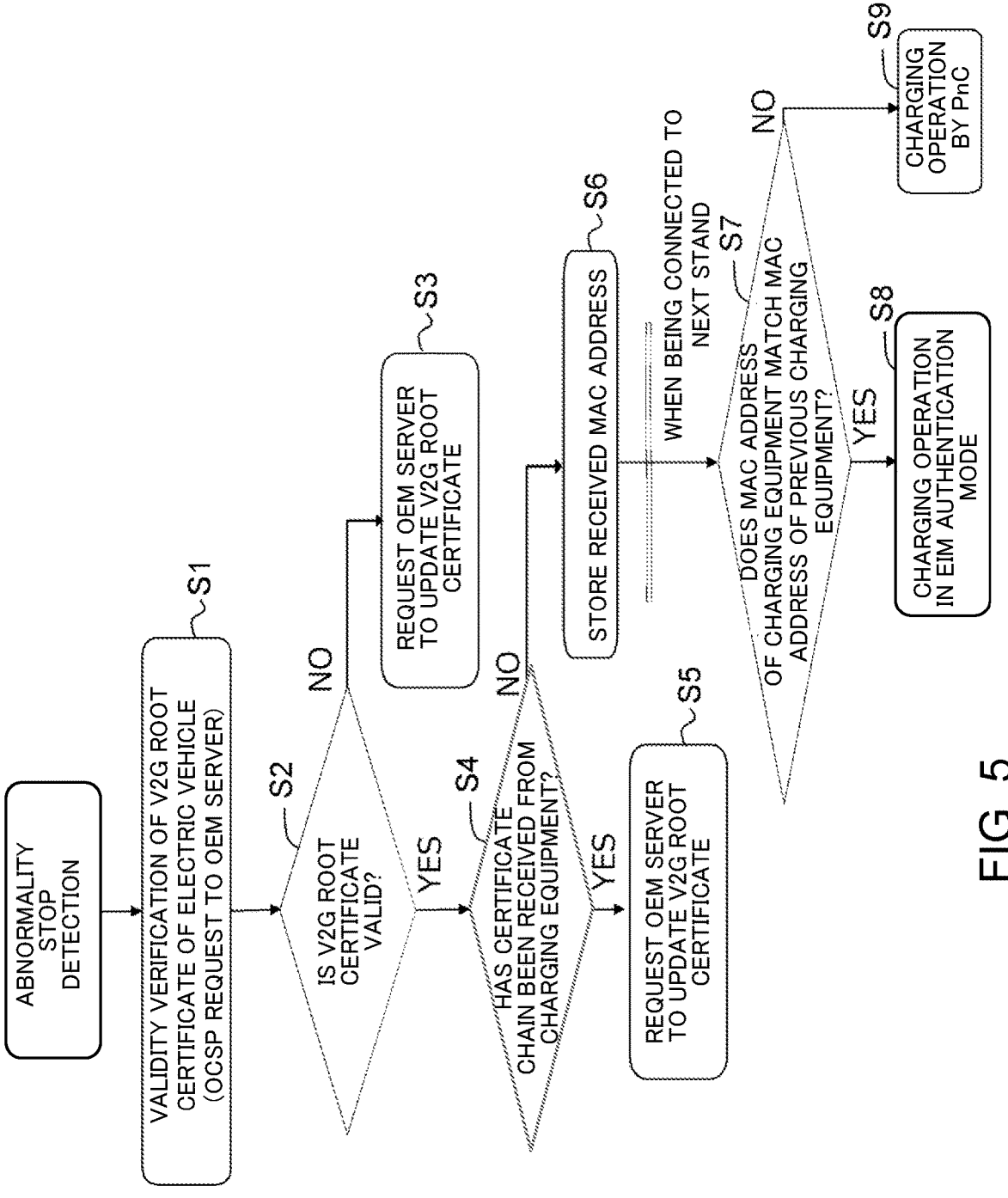
FIG. 5 is a processing example when the electric vehicle notifies the charging equipment of a V2G ROOT certificate and an abnormality is detected.

Hereinafter, processes by the charging control apparatus 10 of the electric vehicle 1 corresponding to the problems (1) to (4) will be exemplified. FIG. 5 is a processing example when the electric vehicle 1 notifies the charging equipment 2 of the V2G ROOT certificate and an abnormality is detected. That is, FIG. 5 illustrates a process when detecting an abnormality stop due to the V2G ROOT certificate stored by the electric vehicle 1. In such a case, the charging control apparatus 10 of the electric vehicle 1 performs validity verification of the V2G ROOT certificate of the electric vehicle 1 (a step S1). More specifically, the charging control apparatus 10 transmits an OCSP request to the OEM server 5 as the computer of the manufacturer or distributer of the electric vehicle 1, and confirms the validity of the V2G ROOT certificate. Here, the charging control apparatus 10 accesses the OEM server 5 on the network by the external communicator 16A.

The charging control apparatus 10 determines whether or not the V2G ROOT certificate stored by the charging control apparatus 10 is valid (a step S2). When the V2G ROOT certificate stored by the charging control apparatus 10 is invalid, the charging control apparatus 10 requests the OEM server 5 to update the V2G ROOT certificate (a step S3). Since the V2G ROOT certificate is updated, the abnormality is canceled. Therefore, the OEM server 5 can be referred to as one example of a management apparatus on the network that can issue the V2G ROOT certificate as the first certificate.

On the other hand, in the determination of the step S2, when the V2G ROOT certificate stored by the charging control apparatus 10 is valid, the charging control apparatus 10 determines whether or not to have received the certificate chain from the charging equipment 2 (a step S4). In the determination of the step S2, when the V2G ROOT certificate stored by the charging control apparatus 10 is valid, it can be assumed that the abnormality is due to an incompatibility between the V2G ROOT certificate stored by the charging control apparatus and the V2G ROOT certificate stored by the charging equipment 2. In such a case, when the charging control apparatus 10 receives the certificate chain from the charging equipment 2, the charging control apparatus 10 requests the OEM server 5 to update the V2G ROOT certificate to acquire the V2G ROOT certificate corresponding to the certificate chain (a step S5).

That is, even when the V2G ROOT certificates respectively stored by the electric vehicle 1 and the charging equipment 2 are incompatible with each other, the certificate chain associated with the V2G ROOT certificate stored by the charging equipment 2 may be returned from the charging equipment 2 to the electric vehicle 1. In this case, the charging control apparatus 10 of the electric vehicle 1 can recognize the certificate authority as an issuer of the V2G ROOT certificate corresponding to the certificate chain sent from the charging equipment 2. Thus, since the electric vehicle 1 acquires the V2G ROOT certificate corresponding to the certificate chain from the OEM server 5 as the computer of the manufacturer or distributer of the electric vehicle 1, the abnormality is canceled. In this case, the certificate chain can be referred to as one example of information that specifies the V2G ROOT certificate stored by the charging equipment 2. Furthermore, the process in the step S5 can be referred to as one example of the process that allows the OEM server 5 to issue the V2G ROOT certificate that is compatible with the V2G ROOT certificate stored by the charging equipment 2.

In the determination of the step S4, when the charging control apparatus 10 does not receive the certificate chain from the charging equipment 2, the charging control apparatus 10 has no information for immediately canceling the abnormality. That is, this is a case in which the abnormality is due to the incompatibility between the V2G ROOT certificate stored by the charging control apparatus 10 and the V2G ROOT certificate stored by the charging equipment 2. Furthermore, in this case, the charging control apparatus 10 cannot acquire the information that specifies the V2G ROOT certificate stored by the charging equipment 2 from the charging equipment 2.

Therefore, in such a case, the charging control apparatus 10 stores a media access control (MAC) address of the charging equipment 2 (a step S6). This MAC address is identification information of the charging equipment 2 in which problems with billing by the PnC arise. Thus, in next and subsequent charging, it is determined whether or not the MAC address stored by the charging control apparatus 10 matches the MAC address of the charging equipment 2 as a connection destination in the next charging (a step S7). When the MAC address stored by the charging control apparatus 10 matches the MAC address of the charging equipment 2 as the next connection destination, the charging control apparatus 10 determines that the problems with billing by the PnC arise in the charging equipment 2 as the next connection destination. Therefore, the charging control apparatus 10 switches from a charging operation by the PnC as the first authentication procedure to a charging operation by the external identification means (EIM) as an authentication mode in place of the PnC (a step S8). As a result, the charging control apparatus 10 suppresses an occurrence of the abnormality in charging by the PnC. The authentication mode by the EIM can be referred to as the second authentication procedure.

On the other hand, the MAC address stored by the charging control apparatus 10 does not match the MAC address of the charging equipment as the next connection destination, the charging control apparatus 10 may perform the charging operation by the PnC (a step S9). As described above, in the process of FIG. 5, when an abnormality is detected in the PnC as the first authentication procedure, the PnC or the authentication mode by the EIM as the second authentication procedure is performed in place of the PnC depending on a type of the abnormality.

Figure 6:
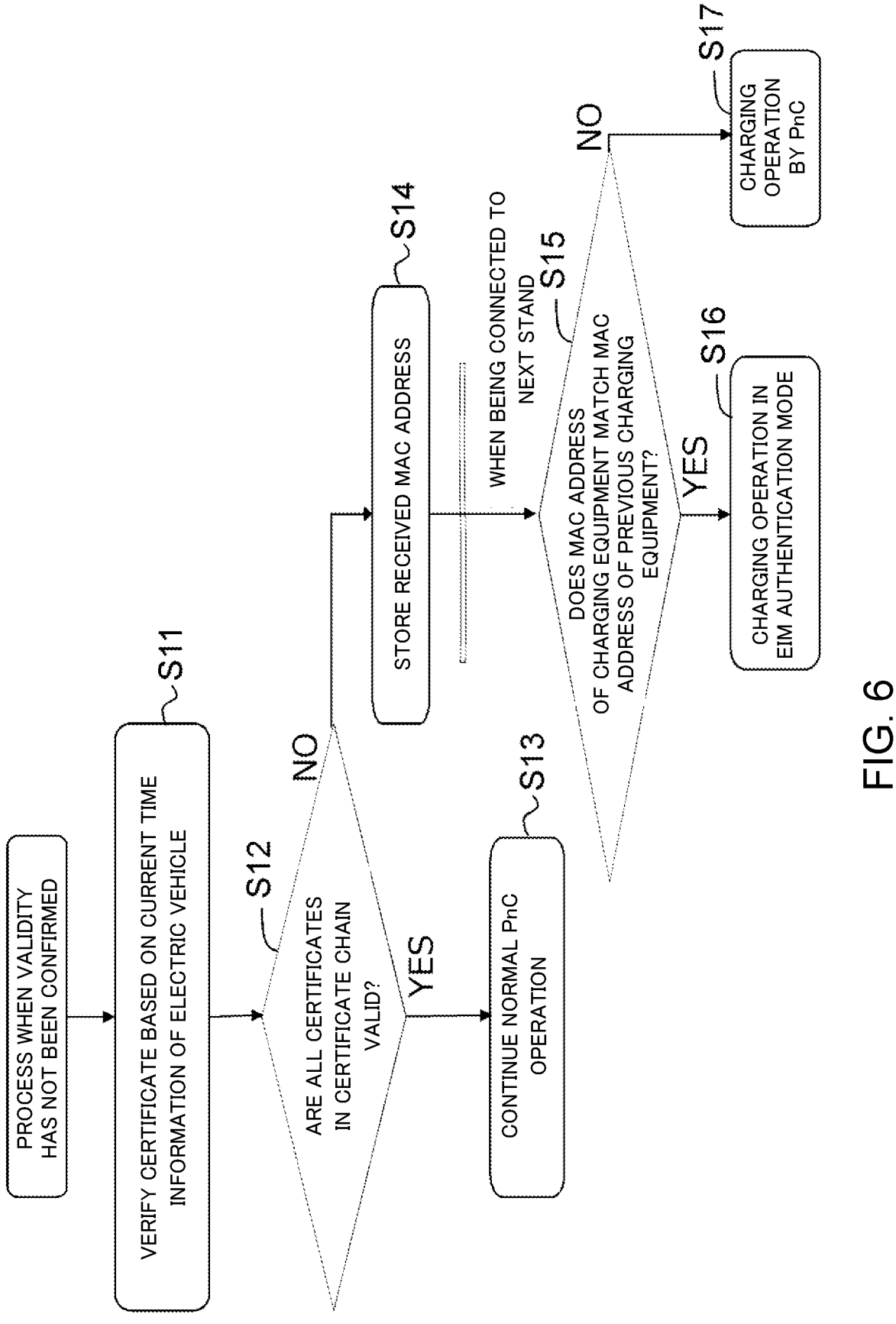
FIG. 6 is a processing example by the charging control apparatus of the electric vehicle when a validity of the certificate chain has not been confirmed in the charging equipment.

FIG. 6 is a processing example by the charging control apparatus 10 of the electric vehicle 1 when a validity of the certificate chain has not been confirmed in the charging equipment 2 That is, when a confirmation result of the validity by the OCSP response is not attached to the certificate chain that has been returned from the charging equipment 2, the charging control apparatus 10 may perform the process of FIG. 6.

In this process, the charging control apparatus 10 verifies whether or not all certificates in the certificate chain returned from the charging equipment 2 are valid based on a current time of the electric vehicle 1 (a step S11). The charging control apparatus 10 determines whether or not all certificates in the certificate chain are valid (a step S12). When all certificates in the certificate chain are valid, the charging control apparatus 10 may continue a normal PnC operation (a step S13).

On the other hand, when any of the certificates is invalid, the charging control apparatus 10 cannot continue the TLS handshake by the certificate chain. The abnormality in this case occurs due to the charging equipment 2, and is difficult to be solved by the charging control apparatus 10 of the electric vehicle 1. That is, the abnormality in this case is due to invalidation of the certificate stored by the charging equipment 2. Thus, the charging control apparatus 10 stores the MAC address of the charging equipment 2 (a step S14). This MAC address is the identification information of the charging equipment 2 in which the problems with billing by the PnC arise.

In the next and subsequent charging, it is determined whether or not the MAC address stored by the charging control apparatus 10 matches the MAC address of the charging equipment as the next connection destination (a step S15). When the MAC address stored by the charging control apparatus 10 matches the MAC address of the charging equipment 2 as the next connection destination, the charging control apparatus 10 determines that the problems with billing by the PnC arise in the charging equipment as the next connection destination. Thus, the charging control apparatus 10 switches from the charging operation by the PnC as the first authentication procedure to the charging operation in the authentication mode by the EIM as the second authentication procedure in place of the PnC (a step S16). As a result, the charging control apparatus 10 suppresses an occurrence of the abnormality in charging by the PnC.

On the other hand, when the MAC address stored by the charging control apparatus 10 does not match the MAC address of the charging equipment as the next connection destination, the charging control apparatus 10 may perform the charging operation by the PnC (a step S17). As described above, in the process of FIG. 6, when an abnormality is detected in the PnC as the first authentication procedure, the PnC or the authentication mode by the EIM as the second authentication procedure is performed in place of the PnC depending on the type of the abnormality.

Figure 7:
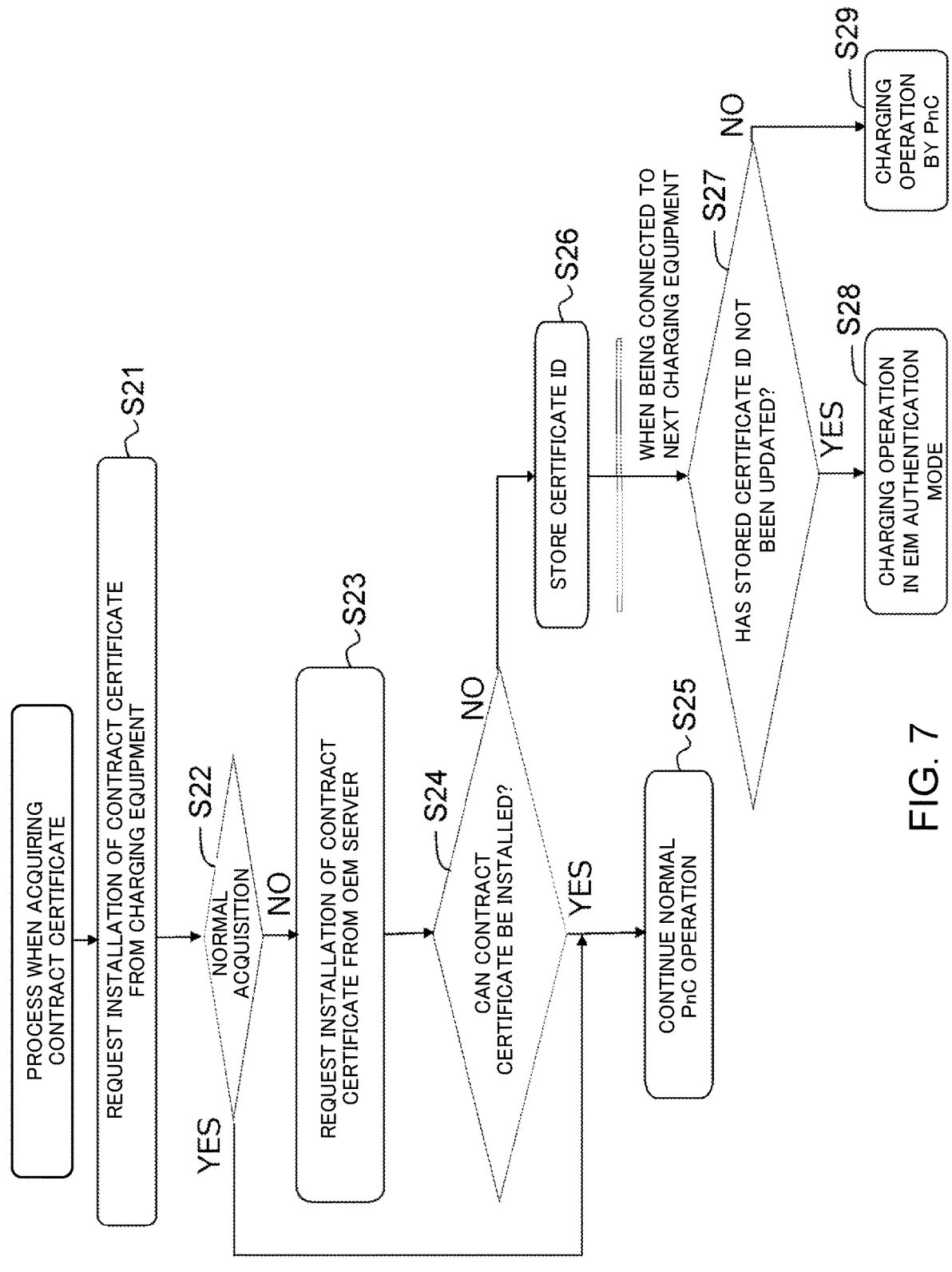
FIG. 7 is a processing example when the charging control apparatus of the electric vehicle requests a Contract certificate from the charging equipment and an abnormality is detected.

FIG. 7 is a processing example when the charging control apparatus 10 of the electric vehicle 1 requests a Contract certificate from the charging equipment 2 and an abnormality is detected. As illustrated in FIG. 4, this is a process after the security of the communication between the charging control apparatus 10 and the charging equipment 2 has been ensured by the V2G ROOT certificate as the first certificate and the certificate chain associated therewith. As described with reference to FIG. 1, the Contract certificate can be referred to as the second certificate for the electric vehicle 1 receiving charging from the charging equipment 2. Furthermore, a case in which the charging control apparatus 10 of the electric vehicle 1 requests the Contract certificate from the charging equipment 2 means a case in which the charging control apparatus 10 does not have the Contract certificate for receiving charging from the charging equipment 2.

In this case, the charging control apparatus 10 of the electric vehicle 1 requests installation of the Contract certificate from the charging equipment 2 (a step S21). The charging control apparatus 10 determines whether or not the charging control apparatus 10 has normally acquired the Contract certificate (a step S22). When the charging control apparatus 10 has normally acquired the Contract certificate, the charging control apparatus 10 moves the process to a step S25 and continues the normal PnC operation.

On the other hand, there is a case in which the charging equipment 2 or the computer of the business operator to which the charging equipment 2 can refer does not hold the valid Contract certificate. In this case, the charging equipment 2 notifies the charging control apparatus 10 of an abnormality. In this case, the charging control apparatus 10 cannot acquire the Contract certificate.

When the abnormality is notified from the charging equipment 2, the charging control apparatus 10 requests the installation of the Contract certificate from the OEM server 5 as the computer of the manufacturer or distributer of the electric vehicle 1 (a step S23). The OEM server 5 can be referred to as one example of the management apparatus on the network that can issue the Contract certificate as the second certificate. The charging control apparatus determines whether or not the Contract certificate can be installed from the OEM server 5 (a step S24). When the Contract certificate can be installed, the charging control apparatus installs the Contract certificate from the OEM server 5 and continues the normal PnC operation (a step S25).

On the other hand, when the Contract certificate cannot be installed, the charging control apparatus 10 stores a certificate ID of the Contract certificate (a step S26). The certificate ID can be referred to as identification information of the Contract certificate as the second certificate.

A case in which the Contract certificate cannot be installed means, for example, a case in which information is not shared between the business operator (mobility service provider) that issues the Contract certificate and the user, and the like. This can be said that the issuance of the Contract certificate has not been prepared. Thus, when the charging control apparatus 10 is connected to the charging equipment 2 at the next time, the charging control apparatus 10 determines again whether or not the Contract certificate identified by the certificate ID stored in the step S26 has not been updated (a step S27). The process in the step S27 is one example of the process of determining whether or not the valid Contract certificate is acquired in the next and subsequent charging. When the Contract certificate has not been updated, the charging control apparatus 10 performs the charging operation in the authentication mode by the EIM as the second authentication procedure in place of the first authentication procedure (a step S28). As a result, the charging control apparatus 10 can avoid the abnormality of the charging operation due to the fact that there is no Contract certificate or the Contract certificate has not been updated. On the other hand, when the Contract certificate has been updated, the charging control apparatus 10 performs the charging operation by the PnC as the first authentication procedure (a step S29). As described above, in the process of FIG. 7, when an abnormality is detected in the PnC as the first authentication procedure, the PnC or the authentication mode by the EIM as the second authentication procedure is performed in place of the PnC depending on the type of the abnormality.

Effects of the Embodiment

In the charging operation by the PnC, it is assumed that there are many problems. For example, an event that the communication session stops due to the incompatibility of the certificates between the electric vehicle 1 and the charging equipment 2 may occur. For such an event, for example, there are possible problems that the charging equipment 2 cannot find the V2G Root certificate stored by the vehicle, the charging equipment 2 does not correspond to a certificate providing service, and the certificate stored by the electric vehicle 1 is invalid. In such a case, although the communication session stops, when the electric vehicle 1 is connected to the same charging equipment 2 again, the same event may repeatedly occur as long as the problems are not fundamentally solved. According to this embodiment, it becomes possible to avoid such an event from repeatedly occurring depending on a type of events or a type of problems.

More specifically, the charging control apparatus 10 of the electric vehicle 1 first performs charging and billing operations (first authentication procedure) by the PnC with the charging equipment 2. When an abnormality is detected, the charging control apparatus 10 of the electric vehicle 1 performs the first authentication procedure or the second authentication procedure in place of the first authentication procedure depending on the type of the abnormality. Here, the second authentication procedure is, for example, an authentication procedure by the external identification means (EIM). As a result, the charging control apparatus 10 can avoid an occurrence of an abnormality in the next charging depending on the type of the abnormality.

More specifically, when the abnormality is due to invalidation of the V2G ROOT certificate as the first certificate, the charging control apparatus 10 allows the OEM server 5 on the network that can issue the V2G ROOT certificate to issue the V2G ROOT certificate. Furthermore, when the abnormality has occurred due to an incompatibility between the V2G ROOT certificate stored by the charging control apparatus 10 and the V2G ROOT certificate stored by the charging equipment 2, the charging control apparatus 10 performs the following process.

First, when the charging control apparatus 10 can acquire the information that specifies the V2G ROOT certificate stored by the charging equipment 2 from the charging equipment 2, the charging control apparatus 10 allows the OEM server 5 as the management apparatus to issue the V2G ROOT certificate. Here, the information that specifies the certificate means the certificate chain associated with the V2G ROOT certificate stored by the charging equipment 2. As a result, when the V2G ROOT certificate stored by the charging equipment 2 is acquired, the charging control apparatus 10 can receive charging by the PnC.

On the other hand, when the charging control apparatus 10 cannot acquire the information that specifies the V2G ROOT certificate stored by the charging equipment 2 from the charging equipment 2, the charging control apparatus 10 stores the MAC address as the identification information of the charging equipment 2. As a result, in the next and subsequent charging, the charging control apparatus 10 performs the authentication mode by the EIM as the second authentication procedure with the charging equipment 2 in place of the PnC as the first authentication procedure. Therefore, the charging control apparatus 10 can appropriately avoid an occurrence of an abnormality in the next charging depending on the type of the abnormality.

Furthermore, when the abnormality is due to invalidation of the certificate chain stored by the charging equipment 2, the charging control apparatus 10 performs the authentication mode by the EIM as the second authentication procedure with the charging equipment 2 in place of the PnC as the first authentication procedure. Therefore, the charging control apparatus 10 can appropriately avoid an occurrence of an abnormality in the next charging depending on the type of the abnormality.

By the way, the V2G ROOT certificate as the first certificate is a certificate for ensuring the security of the communication between the charging control apparatus 10 and the charging equipment 2. After the security of the communication between the charging control apparatus 10 and the charging equipment 2 has been ensured by the V2G ROOT certificate as the first certificate, the charging control apparatus 10 receives charging by the Contract certificate in the V2G communication. However, the charging control apparatus 10 may not have the Contract certificate. In this case, the charging control apparatus 10 may request the Contract certificate from the charging equipment 2. However, the charging equipment 2 may not provide the valid Contract certificate to the charging control apparatus 10. In this case, the charging control apparatus 10 requests the valid Contract certificate from the OEM server 5 as the management apparatus on the network that can issue the Contract certificate. In this way, when the charging control apparatus 10 has acquired the valid Contract certificate, the charging control apparatus 10 can receive charging by the PnC.

However, when the charging control apparatus 10 cannot acquire the valid Contract certificate, the charging control apparatus 10 stores the identification information of the Contract certificate and determines whether or not the valid Contract certificate is acquired in the next and subsequent charging. Then, when the valid Contract certificate has not been acquired, the charging control apparatus 10 performs the charging operation in the authentication mode by the EIM as the second authentication procedure with the charging equipment 2 in place of the PnC as the first authentication procedure. In this way, the charging control apparatus 10 can appropriately avoid an occurrence of an abnormality in the next charging depending on the type of the abnormality.

(Computer Readable Storage Medium)

A program that causes a computer and other machines and devices (hereinafter, referred to as a computer, etc.) to execute the functions of the above embodiment may be stored in a computer-readable storage medium. The functions may be provided by the computer, etc. reading out and executing the program of this storage medium.

Here, the computer-readable storage medium means a storage medium that stores information such as data and programs by electrical, magnetic, optical, mechanical, or chemical action and may be read from the computer, etc. Examples of such a storage medium that can be removed from the computer, etc. include a flexible disk, a magneto-optical disk, a CD-ROM, a CD-R/W, a DVD, a Blu-ray disk, a DAT, an 8 mm tape, and a memory card such as a flash memory card. In addition, storage media fixed to the computer, etc. include a hard disk, a ROM (Read Only Memory), and the like. A SSI) (Solid State Drive) can be used as a storage medium that can be removed from the computer, etc. or a storage medium fixed to the computer, etc.

While the invention has been shown and described in detail, the foregoing description is in all aspects illustrative and not restrictive. It is therefore understood that numerous other modifications and variations can be devised without departing from the scope of the invention.

What is claimed is:

1. A charging control apparatus that is installed in a vehicle on which a battery is mounted, the charging control apparatus comprising:

a memory storing a first certificate; and a processor that is configured to:

transmit the first certificate to an external charging equipment that charges the battery and request a first authentication procedure to the external charging equipment;

receive a result of the first authentication procedure from the external charging equipment;

transmit a request to issue an updated first certificate to a management apparatus on a network when the result of the first authentication procedure shows that the first authentication procedure failed due to an invalidity of the first certificate; and receive the updated first certificate from the management apparatus and request the first authentication procedure by using the updated first certificate.

2. The charging control apparatus according to claim 1, wherein the processor is further configured to:

when the result of the first authentication procedure shows that the first authentication procedure failed due to incompatibility between the first certificate and a certificate stored by the external charging equipment and when information that specifies the certificate stored by the external charging equipment has been acquired by the processor from the external charging equipment, allow the management apparatus to issue the first certificate that is compatible with the certificate stored by the external charging equipment, and then again perform the first authentication procedure using the first certificate that is compatible with the certificate stored by the external charging equipment.

3. The charging control apparatus according to claim 2, wherein the processor is configured to, when the result of the first authentication procedure shows that the first authentication procedure failed due to the incompatibility between the first certificate and the certificate stored by the external charging equipment and when the information that specifies the certificate stored by the external charging equipment cannot be acquired by the processor from the external charging equipment, in next and subsequent charging, store identification information of the external charging equipment so that a second authentication procedure is performed with the external charging equipment in place of the first authentication procedure.

4. The charging control apparatus according to claim 2, wherein the first certificate is for ensuring security of communication with the external charging equipment, and the processor is configured to, when the processor does not have a second certificate for receiving charging from the external charging equipment after the security of the communication with the external charging equipment has been ensured by the first certificate, request the management apparatus to issue the second certificate, and the processor is configured to, when the processor has acquired the second certificate from the management apparatus in response to the request, perform the first authentication procedure with the external charging equipment.

5. The charging control apparatus according to claim 4, wherein the processor is configured to, when the processor cannot acquire the second certificate from the management apparatus in response to the request, store identification information of the second certificate and, in next and subsequent charging, determine whether or not the second certificate has been acquired, and the processor configured to, when the second certificate has not been acquired, perform a second authentication procedure with the external charging equipment in place of the first authentication procedure.

6. The charging control apparatus according to claim 5, wherein the first authentication procedure is a plug and charge (PnC) and the second authentication procedure is an external identification means (EIM).

7. The charging control apparatus according to claim 1, wherein the processor is configured to, when the result of the first authentication procedure shows that the first authentication procedure failed due to invalidation of a certificate stored by the external charging equipment, store identification information of the external charging equipment so that a second authentication procedure is performed with the external charging equipment in place of the first authentication procedure.

8. An on-vehicle charging control device that is configured to control a charging operation from an external charging station to a car battery, the on-vehicle charging control device comprising:

a memory storing a first certificate; and a processor that is configured to:

transmit the first certificate to an external charging equipment that charges the battery and request a first authentication procedure to the external charging equipment;

receive a result of the first authentication procedure from the external charging equipment;

transmit a request to issue an updated first certificate to a management apparatus on a network when the result of the first authentication procedure shows that the first authentication procedure failed due to an invalidity of the first certificate; and receive the updated first certificate from the management apparatus and request the first authentication procedure by using the updated first certificate.

9. A charging control method performed by a processor of a charging control apparatus installed in a vehicle on which a battery is mounted, the method comprising the steps of:

storing a first certificate in a memory:

the processor transmitting the first certificate to an external charging equipment that charges the battery and requesting a first authentication procedure to the external charging equipment;

the processor receiving a result of the first authentication procedure from the external charging equipment;

the processor transmitting a request to issue an updated first certificate to a management apparatus on a network when the result of the first authentication procedure shows that the first authentication procedure failed due to an invalidity of the first certificate; and the processor receiving the updated first certificate from the management apparatus and requesting the first authentication procedure by using the updated first certificate.

10. The charging control method according to claim 9, wherein when the result of the first authentication procedure shows that the first authentication procedure failed due to incompatibility between the first certificate and a certificate stored by the external charging equipment and when information that specifies the certificate stored by the external charging equipment has been acquired by the processor from the external charging equipment, the method includes allowing the management apparatus to issue the first certificate that is compatible with the certificate stored by the external charging equipment and then again performing the first authentication procedure using the first certificate that is compatible with the certificate stored by the external charging equipment.

11. The charging control method according to claim 10, wherein when the result of the first authentication procedure shows that the first authentication procedure failed due to the incompatibility between the first certificate and the certificate stored by the external charging equipment and when the information that specifies the certificate stored by the external charging equipment cannot be acquired by the processor from the external charging equipment, in next and subsequent charging, the method includes storing identification information of the external charging equipment so that a second authentication procedure is performed with the external charging equipment in place of the first authentication procedure.

12. The charging control method according to claim 10, wherein the first certificate is for ensuring security of communication with the external charging equipment, when the charging control apparatus does not have a second certificate for receiving charging from the external charging equipment after the security of the communication with the external charging equipment has been ensured by the first certificate, the method includes requesting the management apparatus to issue the second certificate, and when the charging control apparatus has acquired the second certificate from the management apparatus in response to the request, the method includes performing the first authentication procedure with the external charging equipment.

13. The charging control method according to claim 12, wherein when the charging control apparatus cannot acquire the second certificate from the management apparatus in response to the request, the method includes storing identification information of the second certificate and, in next and subsequent charging, determining whether or not the second certificate has been acquired, and when the second certificate has not been acquired, the method includes performing a second authentication procedure with the external charging equipment in place of the first authentication procedure.

14. The charging control method according to claim 9, wherein when the result of the first authentication procedure shows that the first authentication procedure failed due to invalidation of a certificate stored by the external charging equipment, the method includes storing identification information of the external charging equipment so that a second authentication procedure is performed with the external charging equipment in place of the first authentication procedure.

\* \* \* \* \*